Aug. 25, 1970
W. E. GERBER
3,525,153
ORTHODONTIC APPLIANCE
Original Filed Aug. 11, 1967
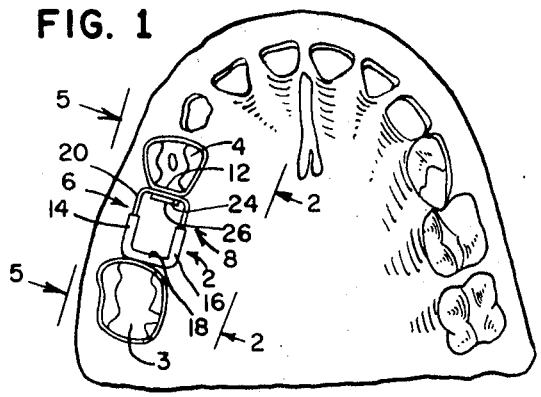
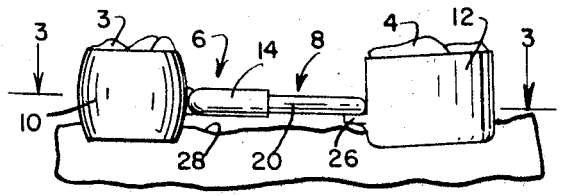
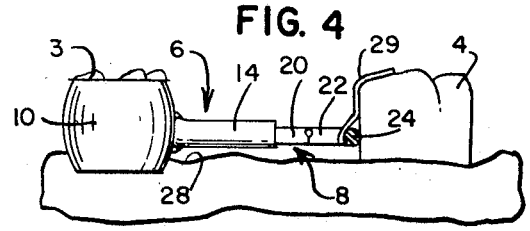
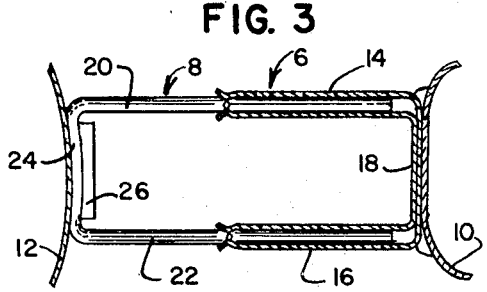
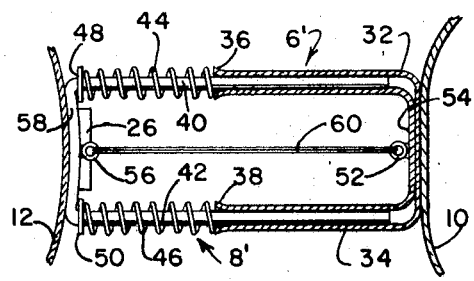
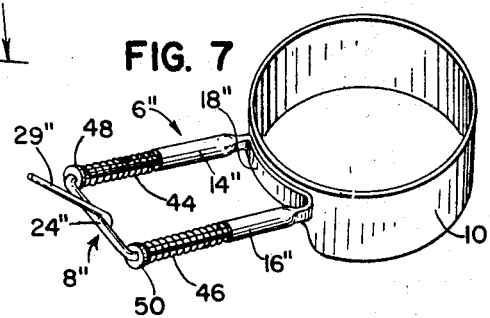
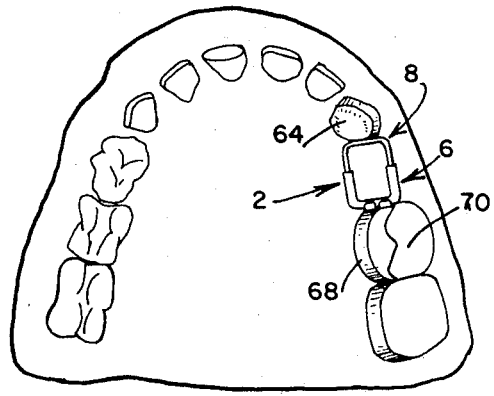
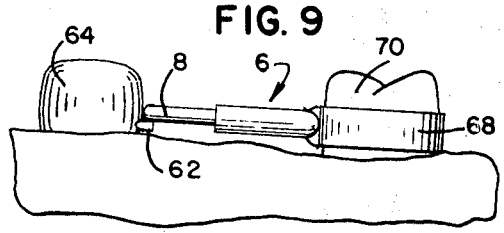
Inventor
Warren E. Gerber
By
Pranglly, Baird, Clayton, Miller & Vogel
Attys.

United States Patent Office 3,525,153
Patented Aug. 25, 1970

3,525,153
ORTHODONTIC APPLIANCE
Warren E. Gerber, 370 Berkeley,
Winnetka, Ill. 60093
Continuation of application Ser. No. 660,058, Aug. 11, 1967, which is a continuation-in-part of application Ser. No. 457,060, May 19, 1965. This application Oct. 4, 1968, Ser. No. 791,201
Int. Cl. A61c 7/00
U.S. Cl. 32—14
11 Claims

ABSTRACT OF THE DISCLOSURE

An orthodontic appliance comprising a band for a first tooth, a generally U-shaped tubular member having parallel side arms and a connecting cross member, the cross member being secured to a mesial side of the band with the parallel side arms extending therefrom, and a U-shaped wire member having parallel side arms telescopingly received in the parallel side arms of the tubular member, the portion of the wire member extending laterally between the parallel side arms thereof thereby being longitudinally adjustable relative to the cross member to engage a second tooth, whereby upon fastening the wire member in the adjusted position relative to the cross member the laterally extending portion of the wire member is adapted to bear against the second tooth so that the teeth are maintained in spaced relation.

CROSS-REFERENCE TO RELATED APPLICATIONS

This application is a continuation of my application Ser. No. 660,058 filed Aug. 11, 1967 and now abandoned, which is in turn a continuation-in-part of my application Ser. No. 457,060, filed May 19, 1965, entitled "Orthodontic Appliance" and now abandoned.

BACKGROUND OF THE INVENTION

This invention relates to an orthodontic appliance and more particularly to an orthodontic appliance capable of preventing space loss, or for restoring proper spacing, when deciduous molars and premolars or bicuspids are lost prematurely.

Premature loss of a deciduous molar or premolar creates the opportunity for mesial drift of the adjacent premolars and molars toward the space left by the lost tooth. The term "mesial" as used herein refers to the direction of tooth movement toward the extraction space or gap left by a missing tooth. The term "mesial" is also used to identify that side of a tooth or tooth band which faces the extraction space. The two teeth on opposite sides of an extraction space thus have mesial side surfaces which face each other. The terms "buccal" and "lingual" surfaces are used herein in a conventional sense as denoting the surfaces of a tooth or tooth band which face the cheek and tongue respectively.

One of the most valuable services a dentist can render his patient is the prevention of space loss when deciduous molars are lost prematurely. Failure to prevent space loss can result in a crowding of the permanent dentition and possible impaction of the bicuspids. Early loss of the second deciduous molars creates the greatest problem since such loss permits the first permanent molar to drift mesially, thereby blocking the path of eruption of the second bicuspids. The multiple premature loss of deciduous teeth may well destroy the normal occlusion of the teeth.

Where corresponding teeth are lost bilaterally, the space can be maintained most effectively by the use of a lingual arch wire attached to orthodontic bands fitted to the first permanent molars on opposite sides of the mouth and extending behind the anterior teeth with space maintaining spurs soldered to the lingual arch wire and engaging the first deciduous molars.

Where a mesial drift appears likely or has occurred due to a premature unilateral loss of a deciduous molar or premolar a unilateral space maintainer is required, but the fitting of the presently known devices for that purpose is quite costly.

It is accordingly an object of this invention to provide an orthodontic appliance in the form of a unilateral space maintainer of simple structure and capable of simple placement and adjustment to obtain an exact fit in the patient's mouth.

At times the need for a unilateral space maintainer is not recognized until some mesial drift has occurred and in those instances, it is, of course, not sufficient merely to prevent further drift, but necessary to restore a sufficient space between the drifted teeth to prevent crowding of the permanent dentition or the possible impaction of the bicuspids.

It is accordingly a further object of the invention to provide a unilateral space maintainer which is readily convertible into a space regainer by the placement thereon of means for pushing the teeth apart to restore the required spacing for the succedaneous teeth.

Yet another object of the invention is to provide an orthodontic appliance which, when utilized either as a space maintainer or space regainer, produces a minimal amount of traumatic interference in the patient's mouth.

Still another object of the invention is to provide an orthodontic appliance in the form of a unilateral space maintainer which includes an occlusal rest thereon to prevent movement of the appliance onto the gingival tissue in the area of the missing tooth.

A further object of the invention is to provide a simple and satisfactory method of making and fitting a unilateral space maintainer in a patient's mouth.

SUMMARY OF THE INVENTION

Briefly stated, the invention contemplates an orthodontic appliance for establishing a desired spacing between two teeth separated by a gap vacated by a missing tooth, the teeth having facing mesial sides, and having buccal and lingual surfaces facing the cheek and tongue respectively. The appliance comprises an elongated tubular member and an elongated wire member telescopingly received and supported within the tubular member. A mounting means is secured at one end of one of the members remote from the other member, and is adapted to secure the appliance to one of the teeth to extend from the mesial side thereof across the gap to bear on the other tooth. The tubular and wire members are configured to be confined within the gap and to be free of projections extending across the buccal and lingual surfaces when the appliance is installed. The members are slidable on each other whereby the overall length of the appliance is adjustable.

In accordance with one aspect of the invention, there is provided an orthodontic appliance comprising a band for a first tooth, a generally U-shaped tubular member having a parallel side arms and a connecting cross member, the cross member being secured to a mesial side of the band with the parallel side arms extending therefrom. A U-shaped wire member having parallel side arms is telescopingly received in the parallel side arms of the tubular member, the portion of the wire member extending laterally between the parallel side arms thereof thereby being longitudinally adjustable relative to the cross member to engage a second tooth, whereby upon fastening the wire member in the adjusted position relative to the cross member the laterally extending portion of the wire member is adapted to bear against the second tooth so that the teeth are maintained in spaced relation.

BRIEF DESCRIPTION OF THE DRAWINGS

Other and further objects and advantages of the invention will be apparent from the following description when taken in connection with the accompanying drawing, in which:

FIG. 1 is a plan view of a first form of the orthodontic space maintainer embodying the present invention mounted in a mandibular arch;

FIG. 2 is an enlarged view in elevation looking along the line 2—2 of FIG. 1;

FIG. 3 is an enlarged fragmentary view in horizontal section taken along the line 3—3 of FIG. 2;

FIG. 4 is an enlarged fragmentary view similar to FIG. 2 but showing a second form of the orthodontic space maintainer;

FIG. 5 is a view generally along line 5—5 of FIG. 1 illustrating the first form of the space maintainer when modified for use as a space regainer;

FIG. 6 is a fragmentary view in horizontal section taken along the line 6—6 of FIG. 5;

FIG. 7 is a perspective view of the second form of the space maintainer as modified for use as a space regainer; and FIGS. 8 and 9 are views similar to FIGS. 1 and 2 but illustrating a cingulum form of the space maintainer.

DESCRIPTION OF THE PREFERRED EMBODIMENTS

Now referring specifically to the drawings, FIG. 1 illustrates a first form of an orthodontic space maintainer 2 embodying the invention mounted on a permanent molar 3 and engaging a premolar or bicuspid 4 for maintaining the required space between those teeth in order to avoid crowding of the permanent dentition and possible impaction of the succedaneous bicuspid.

The first form of the orthodontic space maintainer embodying the present invention comprises, as illustrated in FIGS. 1 to 3, a stainless steel tube 6, a stainless steel wire member 8 and stainless steel bands 10 and 12.

Stainless steel tube 6 is formed in a generally U-shape having spaced parallel hollow arms 14 and 16 and a base or cross portion 18 which is preferably flattened for welding or soldering to the band 10.

The wire member 8 is also generally U-shaped and formed with parallel arms 20 and 22 and a base or laterally extending portion 24 adapted to be supported upon a lug 26 welded or soldered to, or struck from band 12. Arms 20 and 22 of the wire member 8 extend into tubular arms 14 and 16 of tube 6 for sliding adjustment relative thereto and to which they may be welded or soldered in relative adjusted position when fitted in place between teeth 3 and 4.

In application, molar band 10 is first fitted and contoured to the permanent molar 3 and marked with a grease pencil or the like directly above, and close to, the gingival tissue in the area of the missing tooth. Base portion 18 of U-shaped tube 6 is welded or soldered to band 10 along the mark thereon, and arms 14 and 16 are cut to a length equal to about half the spacing between teeth 3 and 4. Band 10 is then fitted back on tooth 3, with the parallel arms of tube 6 extending forwardly in the mouth toward premolar or bicuspid 4, and the arms of the tube are then adjusted by bending to be spaced slightly from the gingival tissue and parallel to an edentulous ridge 28, as illustrated in FIG. 2.

Band 12 is then fitted and contoured to bicuspid 4 with lug 26 adjacent the gingival tissue and facing tube 6 as illustrated in FIG. 2. Arms 20 and 22 of wire member 8 are then inserted in telescoping fashion into arms 14 and 16 of the tube 6 and slidably adjusted thereon so that laterally extending portion 24 of wire member 8 is supported by lug 26 and firmly bears against the band 12. A suitable mark is then made, as by a grease pencil or the like, on each arm of wire member 8 at the end of each arm of tube 6. The unit is then carefully removed and arms 14 and 16 of the tube 6 are welded, soldered or otherwise secured to arms 20 and 22 of wire member 8, the markings on the arms of the wire member serving to indicate the proper adjusted position of tube 6 and wire member 8 during the welding or soldering operation.

Band 12 is then replaced on tooth 4 and cemented in position. Band 10, to which tube 6 and wire member 8 are secured, is next replaced on tooth 3 and cemented in the proper position with laterally extending portion 24 of wire member 8 resting in suporting engagement with lug 26 and in firm abutting engagement with tooth band 12; lug 26 supporting laterally extending portion 24 at a desired elevation relative to cross portion 18 of tube 6. It may be noted that the parallel arms of tube 6 and wire member 8 are spaced apart sufficiently to permit the partial eruption of the succedaneous tooth to the degree sufficient to hold the adjacent tooth against mesial drift, at which time the space maintainer may be removed.

It will be evident from FIGS. 1 and 2 that the space maintainer when mounted as illustrated and described will prevent mesial drift of permanent molar 3 and bicuspid or deciduous premolar 4. It will be evident also that lug 26 on tooth band 12 prevents wire member 8 from being forced, by the occlusion of the teeth of the opposing dental arches or by matter being masticated, into engagement with the gingival tissue adjacent tooth 4.

A preferred embodiment of the space maintainer is illustrated in FIG. 4 of the drawing, wherein space maintainer 2 is generally identical to the first embodiment and includes U-shaped tubular member 6 and U-shaped wire member 8, the tubular member being secured to the mesial side of band 10. In this embodiment, a generally upstanding wire rest 29 is secured to laterally extending portion 24 of wire member 8. Wire rest 29 is bendable to engage the marginal ridge of spaced bicuspid or deciduous premolar 4. A seat for the wire rest may be ground into the marginal ridge before fitting, if necessary.

It will be readily apparent that the embodiment illustrated in FIG. 4 is placed in the patient's mouth in the same manner as the first embodiment, with the exception of placement and fitting of second band 12. Wire rest 29 carried by laterally extending portion 24 is easily bent to the proper shape to support laterally extending portion 24 of the wire member at a desired elevation relative to cross portion 18 of tubular member 6. It will be evident also that wire rest 29, which resides on the ridge of the tooth 4, prevents wire member 8 from being forced, by the occlusion of the teeth of the opposing dental arches, or by matter being masticated, into engagement with the gingival tissue adjacent tooth 4.

When the patient's gum has receded in the area of the lost tooth, it may be difficult or impossible to fit the space maintainer in FIGS. 1 through 4 in proper spaced relation to the gingival tissue along edentulous ridge 28 to avoid, on the other hand, an impingement of members 6 and 8 upon that tissue and yet, on the other hand, to exclude foreign matter, likely to cause a lifting of the wire member out of engagement with band 12. For such instances, tubular member 6 and wire member 8 may be curved longitudinally between bands 10 and 12 to better conform to the gingival tissue of the receding edentulous ridge and to extend substantially parallel thereto and apply, when in proper adjusted position, a downward pressure holding wire member 8 in engagement with lug 26 of tooth ring 12. For such use, either embodiment of space maintainer 2 of FIGS. 1 to 4 may in application be adjusted or bent to the desired shape, or provided in a preformed average curve.

In FIGS. 5 and 6 the first form of space maintainer 2 is shown as modified for use as a space regainer, and comprises a stainless steel tube 6' corresponding to tube 6 and provided with parallel arms 32 and 34 having outwardly flared ends 36 and 38 to receive the ends of arms 40 and 42 respectively of a wire member 8' corresponding to wire member 8. Small, fine-wire coil springs 44 and 46 encircle arms 40 and 42 respectively of wire member 8'. Coil spring 44 bears at one end against flared end 36 of tube 6' and at its other end against a disk-like retainer 48 on arm 40. Similarly, coil spring 46 bears against flared end 38 of arm 34 of tube 6' and against a retainer 50 on arm 42 of wire member 8'. A first stainless steel eyelet 52 is welded or soldered to flattened cross portion 54 of U-shaped tube 6' and a second eyelet 56 is welded or soldered to laterally extending portion 58 of wire member 8' and in conforming relation to eyelet 52. Tube 6' is welded or soldered to tooth band 10. While in use, laterally extending portion 58 of wire member 8' is supported by lug 26 of tooth band 12.

In converting the first form of space maintainer for use as a space regainer as illustrated in FIGS. 5 and 6, bands 10 and 12 are fitted and contoured to teeth 3 and 4, and tube 6' is welded or soldered to band 10 as previously described. Arms 40 and 42 of U-shaped wire member 8' are then inserted in tubular arms 32 and 34 of tubular member 6' and wire member 8' adjusted into seating arrangement with lug 26 of tooth band 12 and in firm abutting engagement with the outer mesial surface of the band. A suitable mark is placed on each arm 40 and 42 of wire member 8' at the end of tubular arms 32 and 34 of member 6'. The unit is then removed, and springs 44 and 46 and retainers 48 and 50 are placed in position on arms 40 and 42 on wire member 8' and the wire arms reinserted into the arms of tube 6'.

A ligature 60, of wire or other suitable material, is inserted in the eyelets 52 and 56 and pulled tight until the markings on arms 40 and 42 reach flared ends 36 and 38 of tube 6' and the ends of the ligature are then twisted about the body of the same to hold tube 6' and wire member 8' in the adjusted position against the urging of springs 44 and 46. The unit is then re-positioned in the patient's mouth with band 10 encircling tooth 3 and end 58 of wire member 8' properly seated upon lug 26 of band 12. Bands 10 and 12 are then cemented to teeth 3 and 4, and ligature 60 removed so as to allow springs 44 and 46 to apply to the teeth a separating force tending to restore the required spacing therebetween.

As shown in FIG. 7, the preferred embodiment of the space maintainer illustrated in FIG. 4 may be easily converted for use as a space regainer. For convenience, the identical parts of the space maintainer illustrated in FIG. 4 have been carried through as double prime numerals in FIG. 7. In this instance, retainers 48 and 50 are inserted onto the arms of the wire member 8", and then springs 44 and 46 are placed in position on the arms of wire member 8" and the wire arms reinserted into the arms of tube 6", as in the case of the first embodiment illustrated in FIGS. 5 and 6. Generally upstanding wire rest 29" is bendable to engage the marginal ridge of the spaced tooth, whereby it will be apparent that use of this embodiment results in the elimination of second tooth band 12, the wire rest providing the support function theretofore provided by lug 26 on band 12.

To facilitate placement of this embodiment in the patient's mouth, an eyelet (such as that shown as 52 of FIG. 6) may be welded to cross member 18". Upstanding wire rest 29", in addition to functioning as a support member, is also used in lieu of eyelet 56 provided on laterally extending portion 58 of the embodiment of FIGS. 5 and 6. In this case, the ligature of wire or other suitable material would be inserted through the eyelet provided on cross portion 18" and wound around upstanding rest 29", thereby to hold tube 6" and wire member 8" in the adjusted position against the urging of springs 44 and 46.

Where the space maintainer is to be used between a premolar or bicuspid and a canine tooth to maintain the proper spacing for eruption of the first bicuspid, as illustrated in FIGS. 8 and 9, front tooth band 12 may be eliminated and wire member 8 fitted to engage the cingulum ridge 62 of the incisor crown of canine tooth 64, which cingulum is adjacent the gingival tissue of the edentulous ridge between the teeth being spaced apart, tube 6 being welded or soldered to tooth band 68 fitted on premolar or bicuspid 70.

It will be evident from the foregoing that the applicant has provided a relatively simple device for maintaining and restoring the proper tooth spacing and capable of ready application and adjustment to accomplish the intended purposes. The orthodontic appliance disclosed herein may be easily fabricated in the dentist's office rather than at a laboratory. A space maintainer constructed in accordance with the disclosure herein is highly advantageous when used as a space regainer where one of the teeth has also shifted lingually. In this instance, the portion of the tubular member can be appropriately located on the mesial side of the band so that the arms of the tubular member and the wire member are maintained parallel to each other so that there is no hindrance of movement of the wire member relative to the tubular member. In this respect, the orthodontic appliance constructed in accordance with applicant's disclosure presents a number of advantages over those forms of space regainers wherein only buccal and lingual tubes are fastened to a tooth band. When such a structure is used to restore a tooth which has shifted lingually, it is necessary to bend the wire member at an obtuse angle with relation to the buccal and lingual tubes in order for the wire member to properly contact the tooth. Because the wire member is bent at an obtuse angle relative to the tubes, the ends of the wire member impinge on the tubes and thereby limit movement of the wire member relative to the tubes. Moreover, the traumatic interference caused by such structure is greatly increased, because the upper teeth would come over the buccal tube and eventually loosen the band, whereas the wire member and tubular member of applicant's appliance are free of projections on the buccal and lingual sides of the teeth and bands, and are disposed in a protected area during occlusion and chewing.

Although certain preferred examples of the invention have been given for purposes of illustration, it will be understood that various changes and modifications can be made therein without departing from the spirit and scope thereof and it is intended to cover in the appended claims all such modifications as fall within the true spirit and scope of the invention.

What is claimed is:

1. An orthodontic appliance comprising a band for a first tooth, a generally U-shaped tubular member having parallel side arms and a connecting cross member, said cross member being secured to a mesial side of said band with said parallel side arms extending therefrom, and a U-shaped wire member having parallel side arms telescopingly received in said parallel side arms of said tubular member, the portion of said wire member extending laterally between the parallel side arms thereof being longitudinally adjustable relative to said cross member to engage a second tooth, whereby fastening said wire member in the adjusted position relative to said cross member positions the laterally extending portion of said wire member to bear against the second tooth so that the teeth are maintained in spaced relation.

2. The orthodontic appliance set forth in claim 1, and further comprising means associated with said laterally extending portion of said wire member to support said laterally extending portion at a desired elevation relative to said cross member.

3. The orthodontic appliance set forth in claim 1, and further comprising a generally upstanding wire rest secured to said laterally extending portion of said wire member, said wire rest being bendable to engage the ridge of the second tooth and thereby support said laterally extending portion of said wire member at a desired elevation relative to said cross member.

4. An orthodontic appliance comprising a band for a first tooth, a second band for a second tool, said second band having a lateral projection thereon normally facing said first band, a generally U-shaped tubular member having parallel side arms and a connecting cross member, said cross member being secured to said band with said parallel side arms extending therefrom toward said second band, and a U-shaped wire member having parallel side arms telescopingly received in said parallel side arms of said tubular member, the portion of said wire member extending laterally between the parallel side arms thereof being longitudinally adjustable relative to said cross member to engage said second band and rest upon said lateral projection, whereupon fastening said wire member in the adjusted position relative to said cross member the laterally extending portion of said wire member is adapted to bear against the second tooth so that said first and second bands and the teeth enclosed thereby are maintained in spaced relation with said lateral projection preventing downward movement of said wire member relative to said second band.

5. An orthodontic appliance for restoring the proper spacing between a patient's spaced teeth between which a deciduous molar has been lost, said orthodontic appliance comprising a band for a first tooth, a generally U-shaped tubular member having parallel side arms and a connecting cross member, said cross member being secured to a mesial side of said band with said parallel side arms extending therefrom, a U-shaped wire member having parallel side arms telescopingly received in said parallel side arms of said tubular member, the portion of said wire member extending laterally between the parallel side arms thereof being longitudinally adjustable relative to said cross member to engage and bear against a second tooth, and spring means carried by said parallel arms of said U-shaped wire member, said spring means urging said wire member outwardly of said tubular member and thereby tending to restore the spacing between the teeth.

6. The orthodontic appliance set forth in claim 5, and further comprising a first mesially extending eyelet carried by said cross member and a second mesially extending eyelet carried by said laterally extending portion of said wire member, said first and second eyelets cooperating to receive removable fastening means therebetween, thereby temporarily to restrain said laterally extending portion in a fixed position relative to said cross member to facilitate placement of said appliance in a patient's mouth.

7. The orthodontic appliance set forth in claim 5, and further comprising a generally upstanding wire rest secured to said laterally extending portion of said wire member, said wire rest being bendable to engage the ridge of the second tooth and thereby support said laterally extending portion of said wire member at a desired elevation relative to said cross member.

8. An orthodontic appliance for restoring the proper spacing between a patient's spaced teeth between which a deciduous molar has been lost, said orthodontic appliance comprising a band for a first tooth, a generally U-shaped tubular member having parallel side arms and a connecting cross member, said cross member being secured to a mesial side of said band with said parallel side arms extending therefrom, a U-shaped wire member having parallel side arms telescopingly received in said parallel side arms of said tubular member, the portion of said wire member extending laterally between the parallel side arms thereof being longitudinally adjustable relative to said cross member to engage and bear against a second tooth, spring means carried by said parallel arms of said U-shaped wire member, said spring means urging said wire member outwardly of said tubular member and thereby tending to restore the spacing between the teeth, a mesially extending eyelet carried by said cross member, and means carried by said laterally extending portion of said wire member intermediate said side arms thereof and cooperating with said eyelet to receive removable fastening means therebetween, thereby temporarily to restrain said laterally extending portion in a fixed position relative to said cross member to facilitate placement of said appliance in a patient's mouth.

9. The orthodontic appliance set forth in claim 8, wherein said means carried by said laterally extending portion of said wire member comprises a generally upstanding wire rest, said wire rest being bendable to engage the ridge of the second tooth and thereby support said laterally extending portion of said wire member at a selected elevation relative to said cross member.

10. An orthodontic appliance for establishing a desired spacing between two teeth separated by a gap vacated by a missing tooth, the teeth having facing mesial sides, and having buccal and lingual surfaces, the appliance comprising an elongated tubular member, an elongated wire member telescopically received and supported within the tubular member, and mounting means secured at one end of one of the members remote from the other member, the mounting means being adapted to secure the appliance to one of the teeth to extend from the mesial side thereof across the gap to bear on the other tooth, the members being configured to be confined within the gap and to be free of projections extending across the buccal and lingual surfaces when the appliance is installed, the members being slidable on each other whereby the overall length of the appliance is adjustable.

11. An orthodonic appliance comprising a band for a first tooth, the band having a mesial side and opposed buccal and lingual surfaces, a generally U-shaped tubular member having parallel side arms and a connecting and laterally extending cross portion, and a U-shaped wire member having parallel side arms telescopingly received in said parallel side arms of said tubular member, the wire member further having a connecting and laterally extending cross portion, the cross portion of one of said members being secured to the mesial side of the band, said one member being free of projections extending across the buccal and lingual surfaces of the band, the laterally extending cross portion of the other member being adapted to bear against a second tooth, the cross portions being adjustably spaced apart by sliding the wire-member side arms within the tubular-member side arms to provide a selected spacing and subsequently fastening the members together so the teeth are maintained in spaced relation.

References Cited
UNITED STATES PATENTS

| | | | |
|---|---|---|---|
| 618,105 | 1/1899 | Knapp | 32—14 |
| 1,199,663 | 9/1916 | Canning | 32—14 |
| 3,127,677 | 4/1964 | Schacter | 32—14 |
| 3,416,229 | 12/1968 | Kesling | 32—14 |

ROBERT PESHOCK, Primary Examiner

PO-1050
(5/69)

UNITED STATES PATENT OFFICE
CERTIFICATE OF CORRECTION

Patent No. 3,525,153    Dated August 25, 1970

Inventor(s) Warren E. Gerber

It is certified that error appears in the above-identified patent and that said Letters Patent are hereby corrected as shown below:

Column 4, line 17, "tooth" should read --teeth--.
Column 5, line 10, "conforming" should read --confronting--.
Column 7, line 2 (Claim 4) "tool" should read --tooth--.

SIGNED AND
SEALED
DEC 22 1970

DEC. 22, 1970

(SEAL)
Attest:

Edward M. Fletcher, Jr.
Attesting Officer

WILLIAM E. SCHUYLER, JR.
Commissioner of Patents